US012630392B2

(12) United States Patent
Yamamoto

(10) Patent No.: US 12,630,392 B2
(45) Date of Patent: May 19, 2026

(54) SAFETY DEVICE FOR AN ELEVATOR

(71) Applicant: Otis Elevator Company, Farmington, CT (US)

(72) Inventor: Masahiro Yamamoto, Narita (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 862 days.

(21) Appl. No.: 17/897,904

(22) Filed: Aug. 29, 2022

(65) Prior Publication Data

US 2024/0067495 A1 Feb. 29, 2024

(51) Int. Cl.
*B66B 5/00* (2006.01)
*B66B 5/02* (2006.01)
*B66B 11/02* (2006.01)

(52) U.S. Cl.
CPC ............ *B66B 5/0012* (2013.01); *B66B 5/005* (2013.01); *B66B 5/025* (2013.01); *B66B 11/0233* (2013.01)

(58) Field of Classification Search
CPC ....... B66B 5/0012; B66B 5/005; B66B 5/025; B66B 11/0233
See application file for complete search history.

(56) References Cited

U.S. PATENT DOCUMENTS 5,347,094 A * 9/1994 Leone .................. B66B 5/0031 187/390
7,954,606 B2 * 6/2011 Tinone .................... B66B 5/005 187/391
11,667,494 B2 * 6/2023 Kattainen ............. B66B 5/0056 187/247
2002/0117358 A1 * 8/2002 Schoppa ................. B66B 13/24 187/391
2022/0185626 A1 6/2022 Rose et al.

FOREIGN PATENT DOCUMENTS

| | | | |
|---|---|---|---|
| CN | 210331194 | U | 4/2020 |
| CN | 111634780 | A | 9/2020 |
| DE | 102016102668 | B4 | 9/2017 |
| DE | 202021003592 | U1 | 2/2022 |
| EP | 3730442 | A1 | 10/2020 |
| JP | 2013180856 | A | 9/2013 |

OTHER PUBLICATIONS

European Search Report for Application No. 22208422.0, Issued Sep. 22, 2023, 10 Pages.
Chinese Office Action for Application No. 202211452819.2, Issued Mar. 25, 2026, 8 Pages.

* cited by examiner

*Primary Examiner* — Bickey Dhakal
(74) *Attorney, Agent, or Firm* — CANTOR COLBURN LLP

(57) ABSTRACT

A safety device includes an external device for the use of inspection within an elevator hoistway, and a human detection sensor in electrical communication with the external device and an elevator controller. The human detection sensor is configured to detect presence of a person within the hoistway in response to the ON operation of the external device to prevent movement of the elevator car.

9 Claims, 3 Drawing Sheets

SAFETY DEVICE FOR AN ELEVATOR

TECHNICAL FIELD

The present invention relates generally to elevator safety system. In particular, the present invention relates to a device and method for detecting presence of a person within a hoistway during maintenance and inspection.

BACKGROUND

Basically, an inspection switch is provided on a predetermined position within a hoistway such as on top of an elevator car or within a pit at the bottom of the hoistway so that a maintenance technician or mechanic gaining access to the hoistway can avoid unexpected movements of the elevator car and safely perform an elevator system maintenance and inspection.

Specifically, a maintenance technician or mechanic may enter a hoistway from a landing door, climb onto the top of an elevator car, activate an inspection switch, and perform an inspection, maintenance, or repair of equipments installed on each floor, elevator ropes, brakes, etc. When access to the pit area is required, a maintenance technician or mechanic enters the hoistway from a landing door at the lowest floor, activates an inspection switch as well, and inspects equipments such as a motor and other control devices installed in the pit.

However, if a maintenance technician or mechanic enters the hoistway through a landing door and inadvertently closes the landing door without activating maintenance/inspection switch, the elevator car will automatically resume normal operation and there is a risk that the mechanic on top of the elevator car or within the hoistway will be put in a risky position.

Further, even if the elevator system is set to maintenance/inspection mode, there is a possibility that the elevator will make unexpected movement during the maintenance and inspection.

Accordingly, it is the object of the present invention to provide an elevator safety device and an elevator maintenance and inspection method that can enhance the safety of a maintenance technician or mechanic with a simple configuration without a need to set a cumbersome safety operation when a maintenance technician or mechanic enters the hoistway and performs maintenance and inspection in the hoistway.

BRIEF DESCRIPTION

According to one aspect of the present invention, a safety device for an elevator includes a human detection sensor. The human detection sensor is configured to detect activation of an external device that is in electrical communication with the human detection sensor, and produce an output to the elevator controller to prevent movement of the elevator car in response to the detection.

According to another aspect of the present invention, a safety device for an elevator includes an external device for the use of inspection within an elevator hoistway, and a human detection sensor in electrical communication with the external device and an elevator controller. The human detection sensor is configured to detect presence of a person within the hoistway in response to the ON operation of the external device and produce an output to the elevator controller to prevent movement of the elevator car.

In some embodiments, the external device includes a portable work light.

In some embodiments, the safety device further includes a light switch for turning on and off a light fixture installed in the hoistway that is electrically connected to the human detection sensor. The human detection sensor is configured to prevent movement of the elevator car in response to the ON operation of the light switch.

In some embodiments, the human detection sensor includes a current detector for the detection of the current of the external device in response to the ON operation of the external device, and a human detection relay connected to the current detector and the elevator controller to produce an output to the elevator controller to prevent movement of the elevator car in response to the detection of the current of the external device.

In some embodiments, the current detector is connected to the human detection relay via a first contact, and the first contact is configured to be open in response to the current detection of the external device.

In some embodiments, the human detection relay is connected to a drive control circuit of the elevator controller via a second contact, and the second contact is configured to be open in response to the first contact being open to prevent movement of the elevator car.

In some embodiments, the safety device further includes a light switch for turning on and off a light fixture installed in the hoistway. The light switch includes a third contact that is electrically connected in series with the first contact of the human detection sensor.

In some embodiments, the human detection relay is connected to a drive control circuit of the elevator controller via a second contact, and the second contact is configured to be open in response to the third contact being open to prevent movement of the elevator car.

According to another aspect of the present invention, a method of performing an elevator maintenance and inspection is disclosed. The method includes plugging an external device for the use of inspection within an elevator hoistway to a human detection sensor that is connected to an elevator controller; and producing an output to the elevator controller to prevent movement of the elevator in response to the external device being plugged in to the human detection sensor.

According to yet another aspect of the present invention, a method of performing an elevator maintenance and inspection is disclosed. The method includes sensing ON operation of an external device brought into an elevator hoistway by a maintenance technician or mechanic during maintenance and inspection, and producing an output to an elevator controller to prevent movement of the elevator car based on the sensed ON operation of the external device.

In some embodiments, the external device includes a portable work light.

In some embodiments, the method further includes installing a light fixture in the hoistway, sensing ON operation of the light fixture, and producing an output to an elevator controller to prevent movement of the elevator car based on the sensed ON operation of the light fixture.

In some embodiments, sensing the ON operation of the external device includes detecting the current of the external device in response to the ON operation of the external device.

These and other aspects of this disclosure will become more readily apparent from the following description and the accompanying drawings, which can be briefly described as follows.

DETAILED DESCRIPTION

Figure 1:
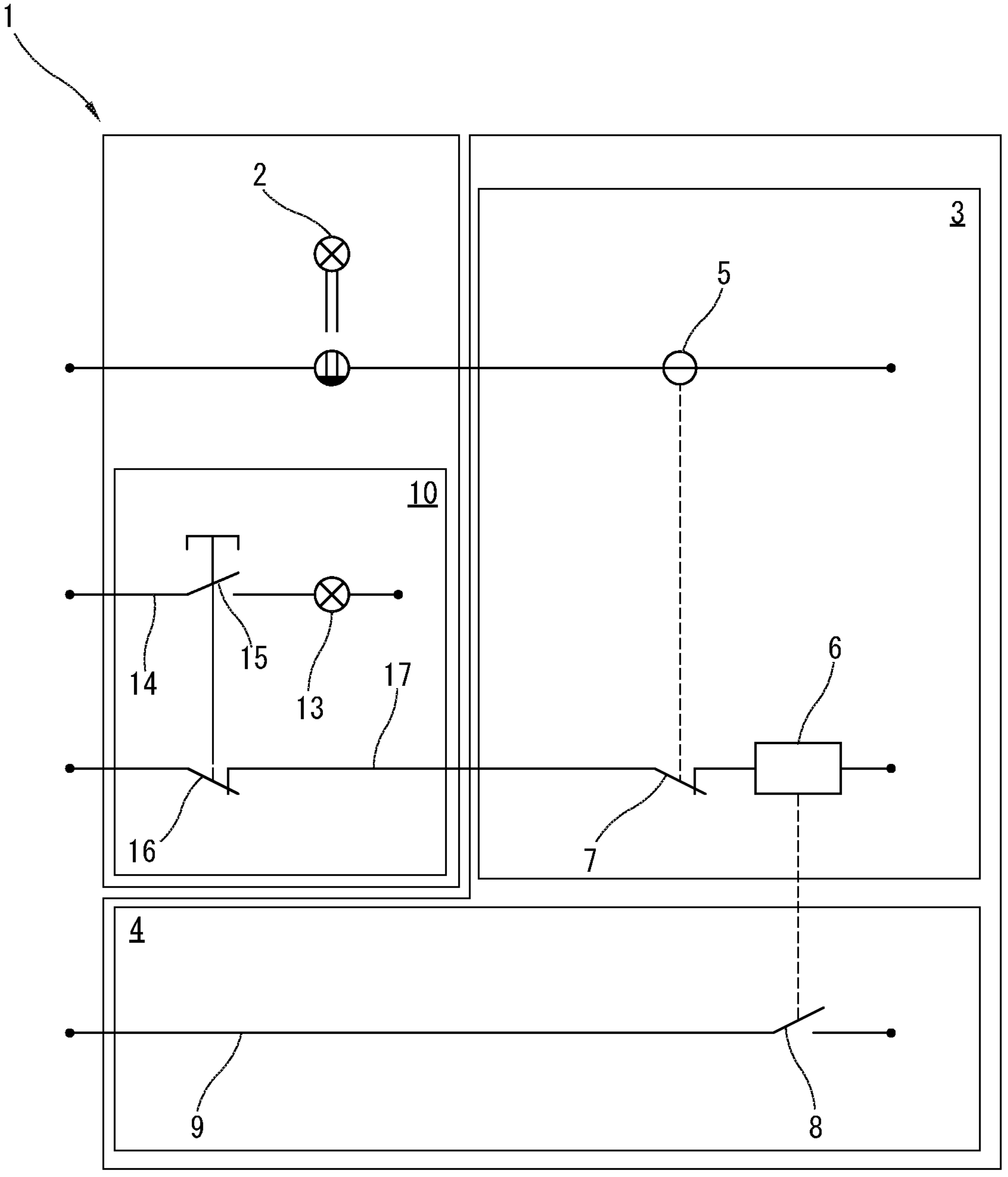
FIG. 1 is a schematic diagram of an exemplary safety device for detecting presence of a person within a hoistway in accordance with the present invention.

FIG. 1 shows a schematic diagram of a safety device 1 in accordance with an embodiment of the present invention. Basically, the safety device 1 includes a human detection sensor 3 that is connected to an elevator controller 4 for automatically activating maintenance/safe mode of an elevator. The elevator controller 4 may be implemented using a general-purpose microprocessor executing a computer program stored on a storage medium to perform the operations described herein. Alternatively, elevator controller 4 may be implemented in hardware (e.g., ASIC, FPGA) or in a combination of hardware/software. In one embodiment, the human detection sensor 3 is configured to automatically activating maintenance/safe mode of the elevator when an external device, such as a portable work light 2, is plugged in to the human detection sensor 3. In another embodiment, the human detection sensor 3 is configured to automatically activating maintenance/safe mode of the elevator in response to the current detection or ON operation of an external device plugged in to the human detection sensor 3.

As shown in FIG. 1, the safety device 1 includes a portable work light 2 used by a maintenance technician or mechanic during maintenance and inspection of an elevator, and the human detection sensor 3 connected between the work light 2 and the elevator controller 4. The human detection sensor 3 includes a current detector 5 for the detection of the current of the work light 2 in response to the ON operation of the work light 2. The current detector 5 is connected to a human detection relay 6 via on/off contact 7. The contact 7 is configured to be open or disconnected in response to the current detection of the work light 2. The human detection relay 6 is further connected to a contact 8 of a drive control circuit 9 of the elevator controller 4. The drive control circuit 9 may be an existing circuit or safety chain that is also connected to an existing inspection switch provided on top of an elevator car or within a pit at the bottom of the hoistway. The human detection relay 6 is configured to open or disconnect the contact 8 of the drive control circuit 9 in response to the contact 7 being open, which prevents or disables movement of the elevator car.

In one example, the human detection sensor 3 is connected to the elevator controller 4 at an arbitrary predetermined position but may be installed or incorporated in the elevator controller 4. Further, the human detection sensor 3 may be configured to be carried together with or integrally with the work light 2 of the present invention and may be connected to the elevator controller 4 via a control panel (not shown) of the elevator car. It may also be mounted in a predetermined position on the elevator car or within the hoistway.

As described in detail below, the safety device 1 may further include a light switch 15 for one or more light fixtures installed along the elevator hoistway.

Figure 2:
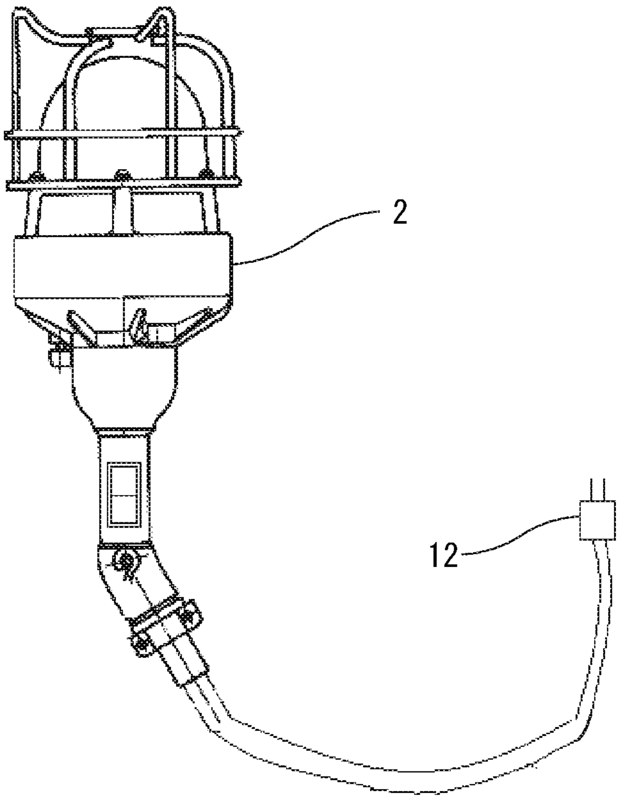
FIG. 2 is a schematic view showing an example portable work light in accordance with an embodiment of the present invention.

FIG. 2 shows an example of an external device or a work light 2 constituting the safety device 1 of the present invention. The work light 2 may be a conventional general work light including an external power plug 12 such as AC plug.

Here, the maintenance and inspection method of the elevator using the safety device 1 according to one embodiment of the present invention will be described in detail with reference to FIGS. 1 and 2.

When performing maintenance and inspection of an elevator system, a maintenance technician or mechanic carrying an external device such as the portable work light 2 gains access to the hoistway through a landing door located above the current position of the elevator car and climbs onto the top of the elevator car to connect the external power plug 12 to the outlet (e.g., AC 100 to 240V) provided at a predetermined position on the top of the elevator car.

When the maintenance technician or mechanic turns on the external device or the work light 2, the current detector 5 of the human detection sensor 3 detects the current and turns open or disconnect the contact 7 to the human detection relay 6. As a result, the human detection relay 6 is turned off. This will, in turn, open the contact 8 of the drive control circuit 9 provided in the elevator controller 4 to prevent or disable movement of the elevator car. In other words, the human detection relay 6 detects human presence within the hoistway in response to the ON operation of the external device or the work light 2 and deactivates normal operation of the elevator car. Thus, the elevator controller 4 initiates stopping of the elevator car and ensures that the elevator is in maintenance and inspection mode.

With such a configuration, even if a maintenance technician or mechanic performs maintenance and inspection without activating any inspection switch, the elevator car operation can be reliably stopped by simply turning on the external device or the work light 2 for the use of inspection in the hoistway. Notably, a mechanic never fails to turn on the work light 2 during inspections within a hoistway. Accordingly, the possibility of a serious accident in the hoistway can surely be avoided.

Figure 3:
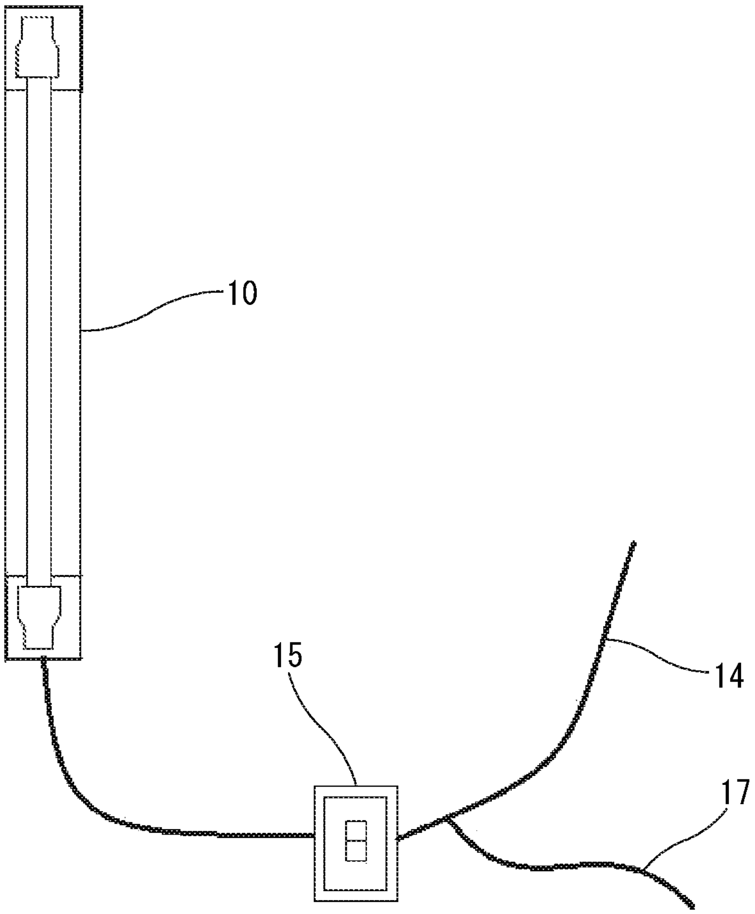
FIG. 3 is a schematic view showing an example light fixture installed in an elevator hoistway on which the safety device in accordance with the present invention is provided.

FIG. 3 shows the configuration of a light fixture 10 installed in the hoistway on which the safety device 1 of the present invention is provided. The light fixture 10 is a conventional general light fixture arranged within the hoistway, but as shown in the figure, it differs from conventional light fixtures in that it is connected to the human detection sensor 3 via human detection circuit 17 in addition to the lighting circuit 14 including an external power supply.

More specifically, as illustrated in FIG. 1, the switch 15 of the light fixture 10 includes a contact 16 for the human detection sensor 3 and is configured to turn open or disconnected in response to the ON operation (i.e., closing operation) of the light switch 15 of the light fixture 10 to turn on a light 13. The contact 16 is connected in series with the on/off contact 7 of the human detection relay 6 of the human detection sensor 3. Therefore, the light fixture 10 is configured such that the contact 16 of the human detection circuit 17 is turned open in response to the light switch 15 in the hoistway being turned ON, and the human detection relay 6 triggers the contact 8 of the drive control circuit 9 of the elevator controller 4 to open in response to the contact 16 being turned open.

Here, the embodiment of FIG. 3 will be described in detail with reference to FIG. 1. When a maintenance technician or mechanic gains access to the hoistway for maintenance and inspection, one or more light fixtures 10 arranged along the hoistway may be turned on by turning on the light switch 15 that is generally installed in a predetermined position in the hoistway, e.g., within a pit or on the top of the elevator car. As shown in FIG. 1, when turning on the light switch 15, the contact 16 of the human detection circuit 17 is turned open or disconnected. As a result, the human detection relay 6 of the human detection sensor 3 connected in series with the contact 16 is turned off. This will, in turn, open the contact 8 of the drive control circuit 9 provided in the elevator controller 4 to prevent or disable movement of the elevator car. In other words, the human detection sensor 3 detects human presence within the hoistway in response to the ON operation of the light fixtures 10 within the hoistway and deactivates normal operation of the elevator car. Thus, the elevator controller 4 initiates stopping of the elevator car and ensures that the elevator is in maintenance and inspection mode.

According to the present invention, even if a maintenance technician or mechanic inadvertently failed to activate any inspection switch during maintenance and inspection, the elevator car operation can be reliably stopped by simply turning on an external switch or the portable work light 2 for the use of inspection, or the light fixtures 10 installed in the hoistway. Notably, a mechanic never fails to turn on the work light 2 or the light fixtures 10 during inspections within a hoistway. Accordingly, the possibility of a serious accident in the hoistway can surely be avoided.

By utilizing the human detection sensor 3 in accordance with the present invention in combination with an existing elevator system, the present invention can provide an improved elevator safety system that can easily retrofit over an existing elevator without substantial modifications and with a compact, lightweight, and inexpensive device. Furthermore, the safety device 1 in accordance with the present invention can operate more reliably than conventional safety systems using motion sensors or optical sensors and can be manufactured at a lower cost and a lower technology level.

While the present invention has been particularly shown and described with reference to the exemplary embodiments as illustrated in the drawings, it will be recognized by those skilled in the art that various modifications may be made without departing from the spirit and scope of the invention as disclosed in the accompanying claims.

What is claimed is:

1. A safety device for an elevator, comprising:

a human detection sensor, wherein the human detection sensor is configured to:

detect activation of an external device that is in electrical communication with the human detection sensor; and produce an output to the elevator controller to prevent movement of the elevator car in response to said detection;

further comprising a light switch for turning on and off a light fixture installed in the hoistway that is electrically connected to the human detection sensor, wherein the human detection sensor is configured to prevent movement of the elevator car in response to the ON operation of the light switch.

2. The safety device of claim 1, wherein the external device includes a portable work light.

3. A safety device for an elevator, comprising:

an external device for the use of inspection within an elevator hoistway; and a human detection sensor in electrical communication with the external device and an elevator controller, wherein the human detection sensor is configured to detect presence of a person within the hoistway in response to the ON operation of the external device and produce an output to the elevator controller to prevent movement of the elevator car;

wherein the human detection sensor includes a current detector for the detection of current of the external device in response to the ON operation of the external device, and a human detection relay connected to the current detector and the elevator controller to produce an output to the elevator controller to prevent movement of the elevator car in response to the detection of the current of the external device.

4. The safety device of claim 3, wherein the current detector is connected to the human detection relay via a first contact, and the first contact is configured to be open in response to the current detection of the external device.

5. The safety device of claim 4, wherein the human detection relay is connected to a drive control circuit of the elevator controller via a second contact, and the second contact is configured to be open in response to the first contact being open to prevent movement of the elevator car.

6. The safety device of claim 4, further comprising a light switch for turning on and off a light fixture installed in the hoistway, wherein the light switch includes a third contact that is electrically connected in series with the first contact of the human detection sensor.

7. The safety device of claim 4, wherein the human detection relay is connected to a drive control circuit of the elevator controller via a second contact, and the second contact is configured to be open in response to the third contact being open to prevent movement of the elevator car.

8. A method of performing an elevator maintenance and inspection, the method comprising:

plugging an external device for the use of inspection within an elevator hoistway to a human detection sensor that is connected to an elevator controller; and producing an output to the elevator controller to prevent movement of the elevator in response to the external device being plugged in to the human detection sensor;

sensing ON operation of a light fixture installed in the hoistway; and producing an output to an elevator controller to prevent movement of the elevator car based on the sensed ON operation of the light fixture;

wherein sensing the ON operation of the external device includes detecting the current of the external device in response to the ON operation of the external device.

9. The method of claim 8, wherein the external device includes a portable work light.

* * * * *